No. 804,236. PATENTED NOV. 14, 1905.
L. A. KEENE.
FIFTH WHEEL.
APPLICATION FILED JULY 14, 1904.
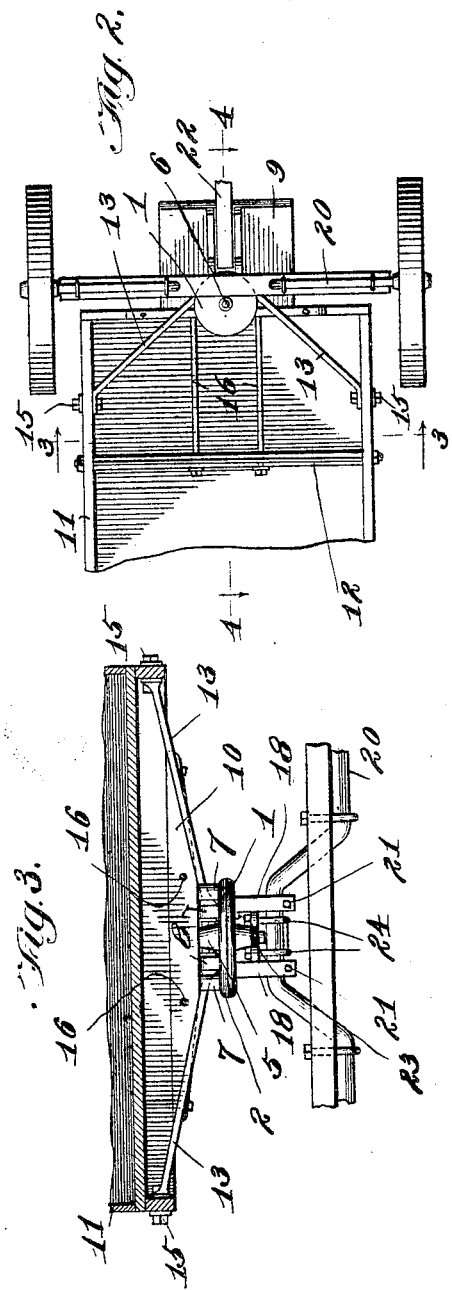
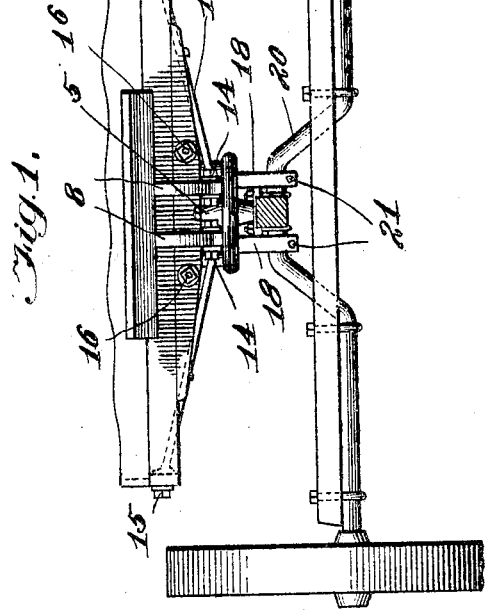
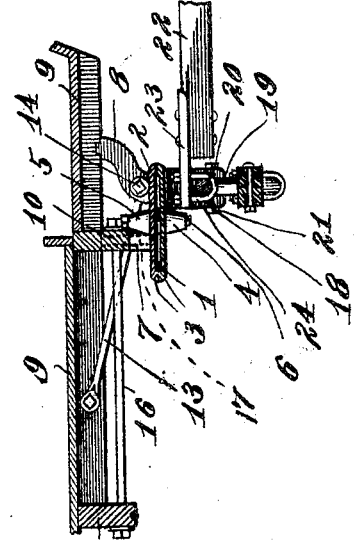
Witnesses:
H. S. Gaither
George L Chindahl
Inventor:
Louis A. Keene.
by Luther L. Miller,
Attorney.

UNITED STATES PATENT OFFICE.

LOUIS A. KEENE, OF WATERMAN, ILLINOIS.

FIFTH-WHEEL.

No. 804,236.  Specification of Letters Patent.  Patented Nov. 14, 1905.

Application filed July 14, 1904. Serial No. 216,554.

*To all whom it may concern:*

Be it known that I, LOUIS A. KEENE, a citizen of the United States, residing at Waterman, in the county of Dekalb and State of Illinois, have invented certain new and useful Improvements in Fifth-Wheels, of which the following is a specification.

This invention relates to the running-gear of vehicles, and refers particularly to a means for attaching and bracing the fifth-wheel.

The invention also refers to a means for securing the upper bolster-circle of the fifth-wheel to the vehicle-body, providing also a supporting-brace extending between the forward side of the upper bolster-circle and a portion of the vehicle-body.

The invention further refers to the various improvements in details hereinafter more particularly shown and described.

In the accompanying drawings, Figure 1 is a front elevation of the fifth-wheel of my invention in its application to a vehicle-body. Fig. 2 is an under side view of the forward part of a vehicle, showing the fifth-wheel of this invention applied thereto. Fig. 3 is a rear elevation of the fifth-wheel and the adjacent parts of the vehicle. Fig. 4 is a vertical section taken on dotted line 4 4 of Fig. 2.

In the construction of a fifth-wheel embodying this invention I provide two bolster-circles 1 and 2, the former being the lower bolster-circle and the latter the upper circle. Upon their meeting faces these circles are provided with integral raised bearing-rings 3 and at their centers with the coinciding tubular outwardly-extending bosses 4 and 5, adapted to receive the king-bolt 6 in their central openings. Rearwardly of the tubular boss 5 and near the periphery of the upper bolster-circle I form the tubular studs 7 integral with said upper bolster-circle. Near the forward side of the upper bolster-circle are two forwardly and upwardly projecting arms 8, also formed integral with the upper bolster-circle, which arms support at their upper ends a forwardly-projecting footboard, a part of the vehicle-body. Said vehicle-body comprises a platform 9, supported upon a forward bolster 10, longitudinal sills 11, and a trussed cross-sill 12. Brace-rods 13, having eyes in their opposite ends, are attached to the lower ends of the arms 8 by the bolts 14, and extending diagonally rearward and outward are secured to the inner faces of the longitudinal sills 11 by means of the bolts 15. Rods 16 extend through suitable openings in the cross-sill 12 and the bolster 10, bracing said bolster against longitudinal strains. The upper bolster-circle 2 is secured to the front bolster 10 by means of bolts 17 extending through the tubular studs 7 and through suitable openings in said bolster.

The lower circle 1 is provided with two downwardly-projecting ears 18 at opposite sides of and forwardly from the tubular boss 4. The lower ends of the ears 18 are bifurcated, providing inverted-U-shape openings 19 therein for receiving the forward axle 20 of the wagon, said axle being held within said openings by means of bolts 21 passing through openings (not shown) formed in the lower ends of said ears.

The rear end of the tongue 22 of the vehicle is pivotally secured to the front axle 20 between the ears 18 by means of a plate 23 bolted to the top of said tongue and clip-bolts 24, extending downwardly from said plate 23 and encircling said axle.

The construction herein shown may be changed in various details without departing from the spirit and scope of my invention. I therefore desire to have it understood that I do not limit myself to the embodiment herein illustrated and described.

I claim as my invention—

1. In a vehicle, in combination, a vehicle-frame comprising longitudinal side sills and a front bolster; an upper bolster-circle secured to said front bolster; a lower bolster-circle; a king-bolt for securing said circles together; means on said lower bolster-circle for supporting an axle; and brace-rods rigidly secured to said upper bolster-circle and said longitudinal side sills, and extending diagonally outward from said bolster-circle to said sills rearwardly of said front bolster.

2. In a vehicle, in combination, a vehicle-frame comprising longitudinal sills and a front bolster; an upper bolster-circle having two upwardly-extending studs, said front bolster resting upon and being secured to said studs; a lower bolster-circle; a king-bolt for securing said circles together; means on said lower bolster-circle for supporting an axle; and brace-rods extending from said upper bolster-circle to said longitudinal sills.

3. In a vehicle, in combination, a vehicle-frame comprising longitudinal sills, a cross-sill and a front bolster; a brace-rod extending between said cross-sill and said front bolster; an upper bolster-circle secured to said front bolster; a lower bolster-circle pivotally connected with said upper circle; brace-rods extending from said upper bolster-circle to said longitudinal sills; and means on said lower bolster-circle for supporting an axle.

4. In a vehicle, in combination, a vehicle-frame comprising longitudinal sills and a front bolster; an upper bolster-circle secured to said front bolster; arms extending upwardly from said upper bolster-circle for supporting a portion of the vehicle-frame; brace-rods extending from said arms to said longitudinal sills; a lower bolster-circle pivotally connected with said upper circle; and means on said lower bolster-circle for supporting an axle.

5. In a vehicle, in combination, a vehicle-frame comprising longitudinal sills, a cross-sill and a front bolster; an upper bolster-circle having two upwardly-extending studs upon which said front bolster rests and is secured; a lower bolster-circle, each of said circles having a tubular boss; a king-bolt extending through said tubular bosses and pivotally connecting said circles; arms extending upwardly from said upper bolster-circle for supporting a portion of the vehicle-frame; brace-rods extending from said arms to said longitudinal sills; brace-rods extending between said cross-sill and said front bolster; and means on said lower bolster-circle for supporting an axle.

LOUIS A. KEENE.

Witnesses:
 M. R. PHARIS,
 B. WILSEY.